United States Patent [19]

Argall et al.

[11] Patent Number: 4,522,744
[45] Date of Patent: Jun. 11, 1985

[54] BURNABLE NEUTRON ABSORBERS

[75] Inventors: Bruce M. Argall; Peter J. Kuchirka, both of Penn Hills; Kenneth C. Radford, Churchill Borough, all of Pa.

[73] Assignee: Westinghouse Electric Corp., Pittsburgh, Pa.

[21] Appl. No.: 416,767

[22] Filed: Sep. 10, 1982

[51] Int. Cl.³ .............................. G21C 7/24; G21F 1/10
[52] U.S. Cl. ........................................ 252/478; 264/44; 264/60
[58] Field of Search ..................... 252/478; 264/44, 60; 419/2, 35, 36, 37

[56] References Cited

U.S. PATENT DOCUMENTS

| 3,148,056 | 9/1964 | Brodie et al. | 419/2 |
| 3,166,615 | 1/1965 | Farrell | 419/35 |
| 3,356,618 | 12/1967 | Rich et al. | 252/478 |
| 3,485,717 | 12/1969 | Eich . | |
| 3,579,390 | 5/1971 | Paine | 419/35 |
| 3,697,374 | 10/1972 | Knight et al. . | |
| 3,751,538 | 8/1973 | Flipot et al. . | |
| 3,812,050 | 5/1974 | Steele . | |
| 3,845,181 | 10/1974 | Ravault . | |
| 3,917,768 | 11/1973 | Abar-Daga et al. . | |
| 3,953,286 | 4/1976 | Watson et al. . | |
| 3,976,735 | 8/1976 | Benton . | |
| 4,025,388 | 5/1977 | Jackson . | |
| 4,104,062 | 8/1978 | Weaver | 419/36 |
| 4,172,762 | 10/1979 | Anthony | 376/333 |
| 4,252,691 | 2/1981 | Lipp et al. | 252/478 |
| 4,381,283 | 4/1983 | Walton | 376/260 |

FOREIGN PATENT DOCUMENTS 722216 11/1965 Canada .................... 252/478

Primary Examiner—Deborah L. Kyle
Attorney, Agent, or Firm—D. E. Erickson

[57] ABSTRACT

Method of making a burnable neutron absorber of boron carbide in a matrix of aluminum oxide. In the practice of this method, boron-carbide particles are coated with a pore former and then they are mixed in a slurry with aluminum oxide powder. When the slurry is subsequently dried and sintered, the pore former is burned out and a body is formed including the boron-carbide particles in a matrix of aluminum oxide with substantially all boron-carbide particles in the body surrounded by a void.

5 Claims, 1 Drawing Figure

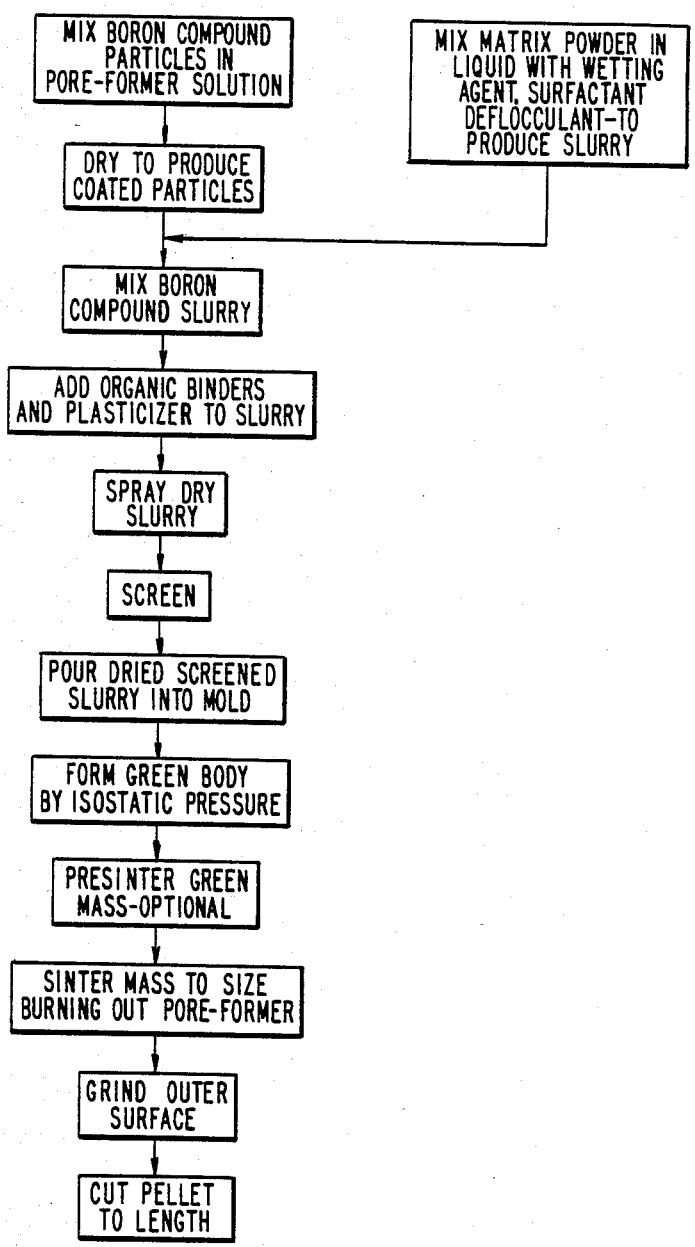

BURNABLE NEUTRON ABSORBERS

CROSS-REFERENCE TO RELATED APPLICATIONS

This application relates to:
1. An application Ser. No. 352,686 filed Feb. 26, 1982 to Kenneth C. Radford and W. George Carlson for Burnable Neutron Absorbers (herein Radford-Carlson 1); and
2. An application Ser. No. 352,731 filed Feb. 26, 1982 to Kenneth C. Radford and W. George Carlson for Burnable Neutron Absorbers (herein Radford-Carlson 2).

Radford-Carlson 1 and 2 are assigned to Westinghouse Electric Corp. Radford-Carlson 1 and 2 are incorporated herein by reference.

BACKGROUND OF THE INVENTION

This invention relates to burnable neutron absorbers and it has particular relationship to neutron absorbers in which the neutron-absorbing component or element is a boron compound. As disclosed in Radford-Carlson 1 and 2, the principal neutron-absorber boron compounds are boron carbide, $B_4C$, and zirconium boride $ZrB_2$. The neutron absorbers are ceramic pellets including the boron compound in a matrix of a highly refractory material. The principle refractory materials are aluminum oxide, $Al_2O_3$, and zirconium oxide, $ZrO_2$. This invention has unique utility with respect of neutron-absorber ceramics in which $B_4C$ and/or $ZrB_2$ are encapsulated in a matrix of $Al_2O_3$ and/or $ZrO_2$. To the extent that this invention is applicable to neutron absorbers including other compounds of boron and/or other matrix materials, or in which the neutron-absorber elements are other than boron but manifest the same swelling properties as boron compounds, such application is within the scope of equivalents of this invention under the doctrine of equivalents as this doctrine is defined and explained by the U.S. Supreme Court in Graver Tank & Mfg. Co., Inc. et al. vs Linde Air Products Co. 339 U.S. Pat. No. 605; 70 S Ct 1017 (1950).

In the practice of the inventions disclosed in Radford-Carlson 1 and 2 satisfactory neutron-absorber ceramic pellets have on the whole been produced. However, at times, cracking or crumbling of such neutron-absorber pellets whose neutron-absorber element is a boron compound has been experienced. It is an object of this invention to overcome this drawback and to provide neutron-absorber pellets which can be relied upon not to crack or crumble.

SUMMARY OF THE INVENTION

This invention arises from the realization that, despite the porosity of the neutron-absorber ceramics produced as taught by Radford-Carlson 1 and 2, it may happen that some of the boron-compound particles in the ceramics are tightly confined in contact with the surrounding matrix material. Under such circumstances, the expansion by reason of thermal expansion and swelling by reason of neutron irradiation of the boron-compound particles, while the neutron absorber is in use, sets up stresses within the ceramic which leads to cracking or crumbling.

In accordance with this invention, the cracking or crumbling is precluded by coating the boron-compound particles with a pore former. The particles so coated are mixed into a slurry of the matrix powder and thereafter, the particles in the slurry are dried and pressed into a green body and the green body is sintered to form a ceramic. The pore formers are volatilized leaving voids around substantially all boron-compound particles. The boron-compound particles may settle under gravity in the voids created, but the voids in which these particles settle afford space for the particles to expand freely without stressing the ceramic internally. It is more probable, however, that the boron-compound particles will adhere to the surface of the pore due to limited chemical reaction with the matrix material, thus providing some degree of integrity of the two phase material.

BRIEF DESCRIPTION OF THE DRAWING

For a better understanding of this invention, both as to its organization and as to its method of operation, together with additional objects and advantages thereof, reference is made to the following description taken in connection with the accompanying drawing, in which the single FIGURE is a flow chart showing the practice of this invention.

DETAILED DESCRIPION OF INVENTION

The flow chart shows the steps followed in making the neutron-absorber ceramic pellets.

Boron-compound powder is thoroughly mixed in a pore-former solution. Typically, the boron compound is natural $B_4C$ with about 20% of $B^{10}$. The mean size of the particles in the powder is between 5 microns and 30 microns; 5–15 microns mean size is preferred. The particles should be sieved to exclude particles having diameters greater than 60 microns. A typical pore former is polymethyl methacrylate (PMMA) dissolved in methyl ethyl keton (MEK): A slurry containing 100 gms $B_4C$ in 200 g of a 20% solution of PMMA in MEK mixed in a shear type food blender to assure good dispersion of the $B_4C$ is preferred.

Other pore forming binders can include: organic stearates, polyvinyl butyral, paraffin wax, vaseline and latex. Either an organic liquid medium which is then evaporated can be used or the binder could be liquefied by the action of applied heat.

It is important that the pore forming binder not dissolve in the binder system used to form the ceramic absorber.

The mixture is dried leaving particles coated with pore former. The solution is typically dried while the boron compound is being mixed in the solution. The powder may require sieving to remove aggregated particles. The coating is typically about 0.001 inch thick but depending upon the void sizes desired, may be of greater or less thickness than 0.001 inch.

The matrix powder, typically $Al_2O_3$, is millmixed separately from the boron compound in a liquid, typically water, with a wetting agent, a surfactant, and a deflocculant to produce a slurry. The mean size of the $Al_2O_3$ is 1–20 microns. Wetting agents, surfactants, and defloculants are listed in Radford-Carlson 1. The components of a typical slurry are:

Linde A $Al_2O_3$ powder: 200 gms;
Lomar PWA wetting agent: 4 gms;
Distilled deionized water: 280 gms.

The dry-coated boron compound is added to the slurry while thoroughly stirring. The quantity of $B_4C$ in the mixture may be between 1% and 25% by weight of the quantity of the $Al_2O_3$, typically.

Organic binders and plasticizers are added to the slurry. Typical binders and plasticizers are listed in Radford-Carlson 1. Typically the slurry will contain 15 wt.% coated $B_4C$ particles based on the initial weight of the $Al_2O_3$ powder. Between 1 and 3 wt.% PVA (polyvinyl alcohol) binder is then added, with about 0.25 to 0.75 wt.% Carbowax 200 plasticizer.

This mixture is blended to ensure good dispersion of the $B_4C$ and also the binder system within the $Al_2O_3$ slurry. The following steps then are taken:

Spray-dry the slurry.

Screen the resulting mixed powder to eliminate agglomerated lumps.

Pour the $Al_2O_3$–$B_4C$ powder into a mold.

Form a green body by isostatic pressure. The pressure may vary between 5,000 and 60,000 pounds per square inch. A pressure of 30,000 pounds per square inch is convenient.

Pre-sinter the green mass. This step is optional, and serves to remove the fugitive binder and other organic components.

Sinter the resulting mass to size, burning out the pore former together with the binder and plasticizer. Typically, the sintering temperature is about 1500° C. With the pore former removed there are voids around substantially all $B_4C$ particles.

Grind the outer surface of the resulting body.

Cut out pellet lengths from the resulting body.

While a preferred embodiment of this invention has been disclosed herein, many modifications thereof are feasible. This invention is not to be restricted except insofar as is necessitated by the spirit of the prior art.

We claim:

1. The method of making a burnable neutron absorber body for a nuclear reactor which comprises:

(a) coating boron-compound particles with a pore former;
   (b) separately producing a slurry of matrix powder in a liquid;
   (c) mixing the boron-compound particles coated with pore former in said slurry to produce a slurry of the boron-compound particles coated with pore former and the matrix powder;
   (d) adding a binder to said last-named slurry to produce a resulting slurry, said pore former being insoluble in the binder system formed of the resulting slurry;
   (e) spray drying the resulting slurry thus produced to obtain a free-flowing mixture of coated boron-compound particles and matrix powder;
   (f) forming a green body of said mixture; and
   (g) sintering said green body and burning out the pore former to form a sintered body of the boron compound in a matrix with substantially all boron-compound particles in a void so as to accommodate expansion of the boron-compound particles during subsequent irradiation.

2. The method of claim 1 wherein the boron compound is one or more of the class consisting of boron carbide ($B_4C$) and zirconium boride ($ZrB_2$).

3. The method of claim 1 wherein the matrix powder is composed of one or more of the class consisting of aluminum oxide ($Al_2O_3$) or zirconium oxide ($ZrO_2$).

4. The method of claim 1 wherein the coated boron-compound particles are formed by mixing boron-compound particles in a pore-former solution and thereafter drying the solution.

5. The method of claim 4 wherein the pore-former solution is dried during the mixing therein of the boron compound.

* * * * *